(12) United States Patent
De Man et al.

(10) Patent No.: US 7,376,255 B2
(45) Date of Patent: May 20, 2008

(54) SYSTEM AND METHOD FOR IMAGE RECONSTRUCTION

(75) Inventors: Bruno Kristiaan Bernard De Man, Clifton Park, NY (US); Peter Michael Edic, Albany, NY (US); Samit Kumar Basu, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 762 days.

(21) Appl. No.: 10/874,976

(22) Filed: Jun. 23, 2004

(65) Prior Publication Data
US 2005/0286749 A1 Dec. 29, 2005

(51) Int. Cl.
*G06K 9/00* (2006.01)
*G06K 9/40* (2006.01)

(52) U.S. Cl. .......................... 382/131; 382/261; 378/4; 378/901

(58) Field of Classification Search ...................... None
See application file for complete search history.

(56) References Cited

U.S. PATENT DOCUMENTS

| | | | | |
|---|---|---|---|---|
| 4,189,775 A | * | 2/1980 | Inouye et al. | 378/11 |
| 5,416,815 A | * | 5/1995 | Hsieh | 378/4 |
| 5,909,476 A | * | 6/1999 | Cheng et al. | 378/4 |
| 6,282,257 B1 | * | 8/2001 | Basu et al. | 378/15 |
| 6,285,799 B1 | * | 9/2001 | Dance et al. | 382/261 |
| 6,351,514 B1 | * | 2/2002 | Besson | 378/15 |
| 6,351,548 B1 | * | 2/2002 | Basu et al. | 382/128 |
| 6,377,654 B1 | * | 4/2002 | Willems et al. | 378/59 |
| 6,452,183 B1 | * | 9/2002 | Nambu | 250/363.04 |
| 6,463,167 B1 | * | 10/2002 | Feldman et al. | 382/128 |
| 6,490,335 B1 | * | 12/2002 | Wang et al. | 378/15 |
| 6,493,416 B1 | * | 12/2002 | Hsieh | 378/4 |
| 6,529,575 B1 | * | 3/2003 | Hsieh | 378/4 |
| 6,701,000 B1 | * | 3/2004 | Hsieh | 382/131 |
| 6,724,856 B2 | * | 4/2004 | De Man et al. | 378/62 |

(Continued)

FOREIGN PATENT DOCUMENTS

DE 198 53 143 9/2000

(Continued)

OTHER PUBLICATIONS

Nagy et al. "Restoring Images Degraded By Spatially Variant Blur", Feb. 1995, NSF Postdoctoral Research Fellowship in the Mathematical Sciences, pp. 1-20.*

Smilowitz et al. "A New Multipurpose Quality Assurance Phantom for Clinical Tomotherapy", Jul. 23-29, 2000, Proceedings of the 22$^{nd}$ Annual EMBS International Conference, Chicago, Ill, pp. 1191-1194.*

Besson, G. "CT Image Reconstruction from Fan-Parallel Projection Data" Applied Science Laboratory, Global Advanced Technology, General Electric Company, 1999 IEEE, pp. 1644-1648.*

(Continued)

*Primary Examiner*—Vikkram Bali
*Assistant Examiner*—Mia M Thomas
(74) *Attorney, Agent, or Firm*—Jason K. Klindtworth; Curtis B. Brueske

(57) ABSTRACT

A method for reconstructing image data acquired by a computed tomography system is provided. The method comprises selecting a portion of image data to be reconstructed and determining a corresponding portion of projection data. An adaptive filter is computed and applied to the portion of projection data to generate a portion of adaptively-filtered projection data. The adaptive filter is computed based upon desired quality properties of the portion of image data. Finally, the portion of image data is reconstructed based upon the portion of adaptively-filtered projection data. The step of selecting, computing and reconstructing is repeated for every pixel or group of pixels comprising the image data.

30 Claims, 5 Drawing Sheets

U.S. PATENT DOCUMENTS

| | | | |
|---|---|---|---|
| 6,807,292 B1* | 10/2004 | Goto et al. | 382/128 |
| 6,999,550 B2* | 2/2006 | Tang | 378/15 |
| 7,187,794 B2* | 3/2007 | Liang et al. | 382/131 |
| 7,215,731 B1* | 5/2007 | Basu et al. | 378/4 |
| 7,215,732 B2* | 5/2007 | Yin et al. | 378/5 |
| 7,227,980 B2* | 6/2007 | Gines | 382/131 |
| 2003/0161443 A1* | 8/2003 | Xiao et al. | 378/210 |
| 2003/0194048 A1* | 10/2003 | De Man et al. | 378/4 |
| 2005/0265590 A1* | 12/2005 | Li et al. | 382/131 |
| 2006/0062443 A1* | 3/2006 | Basu et al. | 382/131 |

FOREIGN PATENT DOCUMENTS

| | | |
|---|---|---|
| WO | WO 02/080100 | 10/2002 |
| WO | WO 02/093490 | 11/2002 |

OTHER PUBLICATIONS

Palubinkas, G. "Adaptive filtering in Magnetic Resonance Images" Department of Neurology, Max-Planck-Institute of Cognitive Neuroscience, Proceedings of ICPR, 1996-IEEE. pp. 523-527.*

Schaeffter, T. et al. "Real Time Adaptive for Projection Reconstruction MR Fluoroscopy" IEEE Transactions on Medical Imaging, vol. 22, No. 1, Jan. 2003, pp. 75-81.*

J. Hsieh, "Adaptive streak artifact reduction in computed tomography resulting from excessive X-ray photon noise", Nov. 1998, Med Phys, vol. 25, No. 11, pp. 2139-2147.

M. Kachelriess, et al "Generalized multi-dimensional adaptive filtering for conventional and spiral single-slice, multi-slice and cone-beam CT", Apr. 2001, Med Phys, vol. 28, No. 4, pp. 475-490.

Bruno De Man, et al "Distance-driven projection and backprojection in three dimensions", Phys. Med. Biol. vol. 49, pp. 2463-2475.

* cited by examiner

SYSTEM AND METHOD FOR IMAGE RECONSTRUCTION

BACKGROUND OF THE INVENTION

The present invention relates generally to the field of imaging systems. In particular, the invention relates to a system and method for reconstructing image data acquired from a computed tomography imaging system.

Computed Tomography (CT) scanners operate by projecting fan shaped or cone shaped X-ray beams through an object. The X-ray beams are generated by an X-ray source, and are generally collimated prior to passing through the object being scanned. The attenuated beams are then detected by a set of detector elements. Each detector element produces a signal based on the intensity of the attenuated X-ray beams, and these signals are processed to produce projection data, also called sinogram data. By using reconstruction techniques, such as filtered backprojection, useful images are formed from the projection data.

A computer is able to process and reconstruct images of the portions of the object responsible for the radiation attenuation. As will be appreciated by those skilled in the art, these images are computed by processing a series of angularly displaced projection data. These data are then reconstructed to produce reconstructed images, which are typically displayed on a cathode ray tube, and may be printed or reproduced on film.

A number of techniques have been employed to improve the image quality of reconstructed image data. Some of these techniques include, for example, pre-processing the projection data by either correcting for physical effects such as beam hardening, partial volume averaging and scatter, or by using adaptive filtering techniques. Adaptive filtering techniques improve the image quality by smoothing or filtering projection data adaptively, wherein the amount of smoothing applied to a given projection data element is based upon the attenuation or on the associated noise level of the projection data element. The entire sinogram or set of projection data elements is pre-processed in this manner and then reconstructed, typically using a conventional filtered backprojection reconstruction technique. As is known by those skilled in the art, adaptive filtering techniques influence one or more image quality parameters such as, for example, spatial resolution and image noise, to improve the overall image quality of the reconstructed image. However, existing adaptive filtering techniques are independent of the pixel (or a group of pixels) being reconstructed. That is, the entire sinogram or set of projection data elements are initially filtered with an adaptive filter, and then the adaptively-filtered sinogram is used to reconstruct the entire image. In addition, existing adaptive filtering techniques are derived based on empirical rules.

Therefore, there exists a need in the art for a technique that provides for improved image data quality while optimally meeting one or more desired image quality properties.

BRIEF DESCRIPTION OF THE INVENTION

Embodiments of the present techniques address this and other needs. In one embodiment, a method for reconstructing image data acquired by a computed tomography system is provided. The method comprises selecting a portion of image data to be reconstructed and determining the corresponding portion of projection data. An adaptive filter is computed and applied to the portion of projection data to generate a portion of adaptively-filtered projection data. The adaptive filter is computed based upon desired quality properties of the portion of image data. Finally, the portion of image data is reconstructed based upon the portion of adaptively-filtered projection data.

In a second embodiment, a computed tomography system for reconstructing image data is provided. The system comprises an X-ray source configured to project a plurality of X-ray beams through an object and a detector configured to produce a plurality of electrical signals in response to received X-ray beams from the source. The system further comprises a system controller configured to process the plurality of electrical signals to generate a plurality of projection data elements. The system controller is further configured to select a portion of image data to be reconstructed and determine a corresponding portion of projection data and compute and apply an adaptive filter to the portion of projection data to generate a portion of adaptively-filtered projection data. The adaptive filter is computed based upon desired image quality properties of the portion of image data. Finally, the system controller is configured to reconstruct the portion of image data based upon the portion of adaptively-filtered projection data.

DETAILED DESCRIPTION OF SPECIFIC EMBODIMENTS

Figure 1:
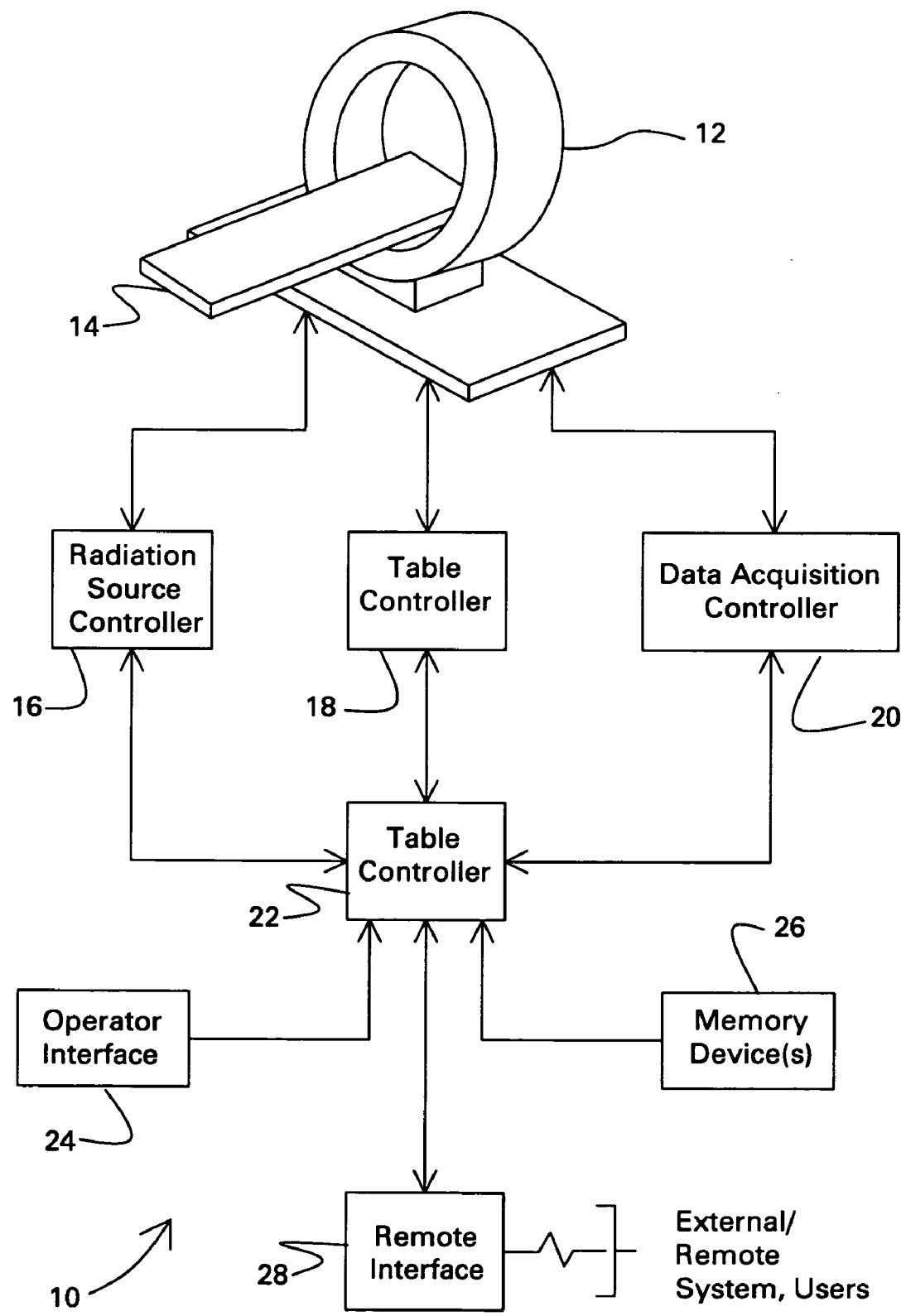
FIG. 1 is a diagrammatical representation of an exemplary CT system in accordance with aspects of the present technique.

Turning now to the drawings, referring first to FIG. 1, a computed tomography (CT) system is illustrated and designated generally by reference numeral 10. In the illustrated embodiment, the computed tomography (CT) system 10 is designed to acquire, process and reconstruct image data in accordance with the present technique as will be described in greater detail below. The CT system 10 comprises a scanner 12 formed of a support structure and internally containing one or more stationary or rotational, distributed sources of X-ray radiation (not shown in FIG. 1) and one or more stationary or rotational digital detectors (not shown in FIG. 1). The scanner is configured to receive a table 14 or other support for a patient, or, more generally, a subject to be scanned. The table can be moved through an aperture in the scanner to appropriately position the subject in an imaging volume or scanning plane during imaging sequences.

The system further includes a radiation source controller 16, a table controller 18 and a data acquisition controller 20, which may all function under the direction of a system controller 22. The radiation source controller 16 regulates timing for discharges of X-ray radiation which is directed from points around the scanner 12 toward a detector element on an opposite side thereof, as discussed below. In the case of stationary CT arrangements, the radiation source controller 16 may trigger one or more emitters in a distributed X-ray source at each instant in time for measuring multiple projection data. In certain arrangements, for example, the X-ray radiation source controller 16 may trigger emission of radiation in sequences so as to collect adjacent or non-adjacent measurements of projection data around the scanner. Many such projection data may be collected in an examination sequence, and data acquisition controller 20, coupled to detector elements as described below receives signals from the detector elements and processes the signals for storage and later image reconstruction. In configurations described below in which one or more sources are rotational, source controller 16 may also direct rotation of a gantry on which the distributed source or sources are mounted. Table controller 18, then, serves to appropriately position the table and subject thereon in a plane in which the radiation is emitted, or generally within a volume to be imaged. The table may be displaced between imaging sequences or during certain imaging sequences, depending upon the imaging protocol employed. Moreover, in configurations described below in which one or more detectors or detector segments are rotational, data acquisition controller 20 may also direct rotation of a gantry on which the detector or detectors are mounted.

System controller 22 generally regulates the operation of the radiation source controller 16, the table controller 18 and the data acquisition controller 20. The system controller 22 may thus cause radiation source controller 16 to trigger emission of X-ray radiation, as well as to coordinate such emissions during imaging sequences defined by the system controller. The system controller may also regulate movement of the table in coordination with such emission so as to collect projection data corresponding to volumes of particular interest, or in various modes of imaging, such as helical acquisition modes. Moreover, system controller 22 coordinates rotation of a gantry on which, either the source(s), detector(s), or both are mounted in the case of rotating CT geometries or arrangements. The system controller 22 also receives data acquired by data acquisition controller 20 and coordinates storage and processing of the data. As will be described in greater detail below, in accordance with the present technique, the system controller is configured to select a portion of image data to be reconstructed, determine a corresponding portion of projection data and compute and apply an adaptive filter to the portion of projection data to generate a portion of adaptively-filtered projection data. Then, the system controller is configured to reconstruct the portion of image data based upon the portion of adaptively-filtered projection data.

It should be borne in mind that the controllers, and indeed various circuitry described herein, may be defined by hardware circuitry, firmware or software. The particular protocols for imaging sequences, for example, will generally be defined by code executed by the system controllers. Moreover, initial processing, conditioning, filtering, and other operations required on the projection data acquired by the scanner may be performed in one or more of the components depicted in FIG. 1. For example, as described below, detector elements will produce analog signals representative of depletion of a charge in photodiodes positioned at locations corresponding to elements of the detector used for data acquisition. Such analog signals are converted to digital signals by electronics within the scanner, and are transmitted to the data acquisition controller 20. Partial processing may occur at this point, and the signals ultimately transmitted to the system controller for further filtering and processing. In the same manner, image reconstruction may be accomplished by application specific integrated circuits residing in the system controller 20, by algorithms executed on the system controller 22, or by remote systems that can access the same data stored in memory device 26 as will be discussed in greater detail below.

System controller 22 is also coupled to an operator interface 24 and to one or more memory devices 26. The operator interface may be integral with the system controller, and will generally include an operator workstation for initiating imaging sequences, controlling such sequences, and manipulating projection data acquired during imaging sequences. The memory devices 26 may be local to the imaging system, or may be partially or completely remote from the system. Thus, imaging devices 26 may include local, magnetic or optical memory, or local or remote repositories for measured data for reconstruction. Moreover, the memory devices may be configured to receive raw, partially processed or fully processed projection data for reconstruction.

System controller 22 or operator interface 24, or any remote systems and workstations, may include software for image processing and reconstruction. Therefore, some or all of the image processing may be performed remotely by additional computing resources based upon raw or partially processed image data. As will be appreciated by those skilled in the art, such processing of CT projection data may be performed by a number of mathematical algorithms and techniques. For example, conventional filtered back-projection techniques may be used to process and reconstruct the image data acquired by the imaging system. However, other techniques such as Radon-based inversion reconstruction, Fourier-based reconstruction, direct reconstruction, maximum likelihood reconstruction, maximum a posteriori reconstruction, Bayesian reconstruction, least-squares reconstruction, algebraic reconstruction or iterative reconstruction approaches may also be employed. A remote interface 28 may be included in the system for transmitting data from the imaging system to such remote processing stations or memory devices.

Figure 2:
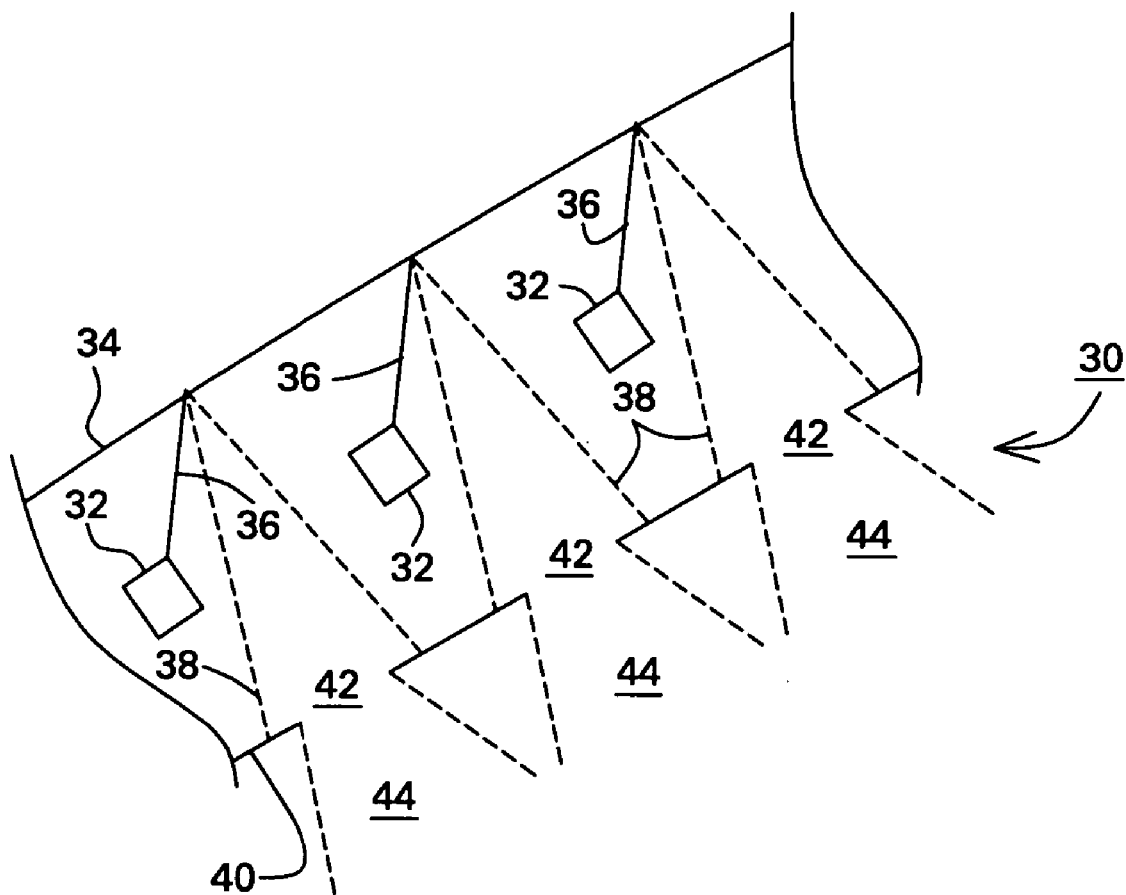
FIG. 2 is a diagrammatical representation of an exemplary distributed source for use with a-system of the type illustrated in FIG. 1.

FIG. 2 illustrates a portion of an exemplary distributed X-ray source of the type that may be employed in the CT system 10 of FIG. 1. As shown in FIG. 2, in an exemplary implementation, the distributed X-ray source 30 may include a series of electron beam emitters 32 that are coupled to radiation source controller 16 shown in FIG. 1, and are triggered by the source controller during operation of the scanner. The electron beam emitters 32 are positioned adjacent to a distributed target 34. Upon triggering by the source controller, the electron beam emitters 32 may emit electron beams 36 toward target 34. The target 34, which may, for example, be a tungsten rail or element, emits X-ray radiation, as indicated at reference numeral 38, upon impact of the electron beams. In reflection mode, X-rays are meant to be produced primarily on the same side of the target as where the electrons impact. In transmission mode, X-rays are produced at the opposite side of the target. The X-ray beams 38 are directed, then toward a collimator 40, which is generally opaque to the X-ray radiation, but which includes openings or apertures 42. The apertures 42 may be fixed in dimension, or may be adjustable. Apertures 42 permit a portion of the X-ray beams to penetrate through the collimator to form collimated beams 44 that will be directed to the imaging volume of the scanner, through the subject of interest, and that will impact detector elements on an opposite side of the scanner.

A number of alternative configurations for emitters or distributed sources may, of course, be envisaged. Moreover, the individual X-ray sources in the distributed source may emit various types and shapes of X-ray beams. These may include, for example, fan-shaped beams, cone-shaped beams, and beams of various cross-sectional geometries. Similarly, the various components comprising the distributed X-ray source may also vary. The emission devices may be one of many available electron emission devices, for example, thermionic emitters, carbon-based emitters, photo emitters, ferroelectric emitters, laser diodes, monolithic semiconductors, etc. Although a distributed source configuration is specifically mentioned here, any combination of one or more rotating-anode, stationary-anode, or distributed X-ray sources may be utilized in the CT system 10.

Figure 3:
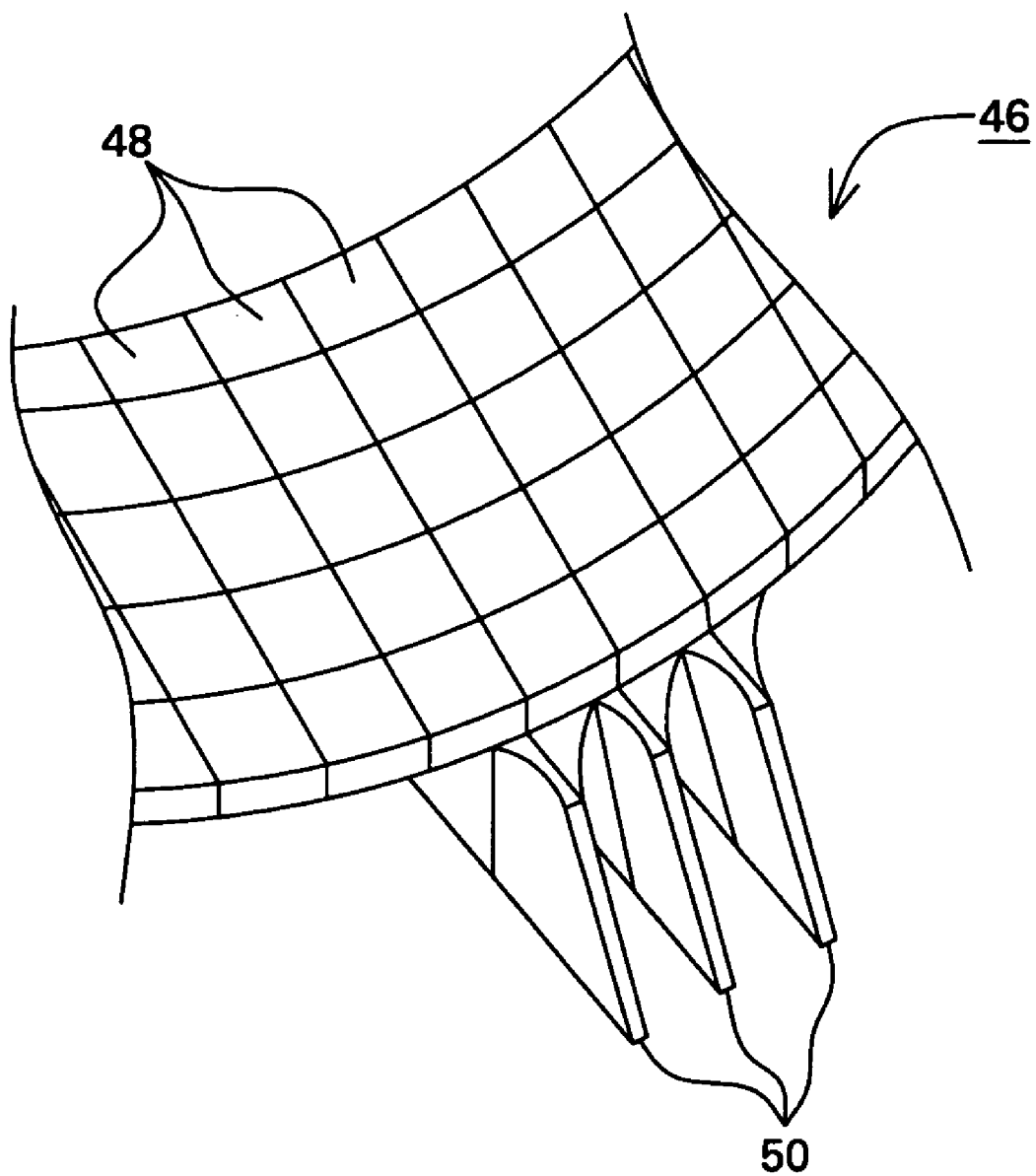
FIG. 3 is a diagrammatical representation of a portion of detector for use with the system illustrated in FIG. 1.

FIG. 3 illustrates a portion of a detector that may be employed by the CT system 10 of FIG. 1. The detector arrangement may be generally similar to detectors used in conventional rotational CT systems, but is preferably extended around a greater portion or the entire inner surface of the scanner in certain embodiments. Each detector may be comprised of detector elements with varying resolution to satisfy a particular imaging application. In general, the detector 46 includes a series of detector elements 48 and associated signal processing circuitry 50. These detector elements may be of one, two or more sizes, resulting in different spatial resolution characteristics in different portions of the measured data. Each detector element may include an array of photodiodes and associated thin film transistors. X-ray radiation impacting the detectors is converted to lower energy photons by a scintillator and these photons impact the photodiodes. A charge maintained across the photodiodes is thus depleted, and the transistors may be controlled to recharge the photodiodes and thus measure the depletion of the charge. By sequentially measuring the charge depletion in the various photodiodes, each of which corresponds to a pixel in the collected data for each acquisition, data is collected that indirectly encodes radiation attenuation at each of the detector pixel locations. This data is processed by the signal processing circuitry 50, which will generally convert the analog depletion signals to digital values, perform any necessary filtering, and transmit the acquired data to the system controller 22 of the imaging system 10 in FIG. 1 as described above. Although a detector configuration comprised of scintillation material and storage diodes is mentioned, any suitable detector for measuring X-rays may be used with the present technique.

Figure 4:
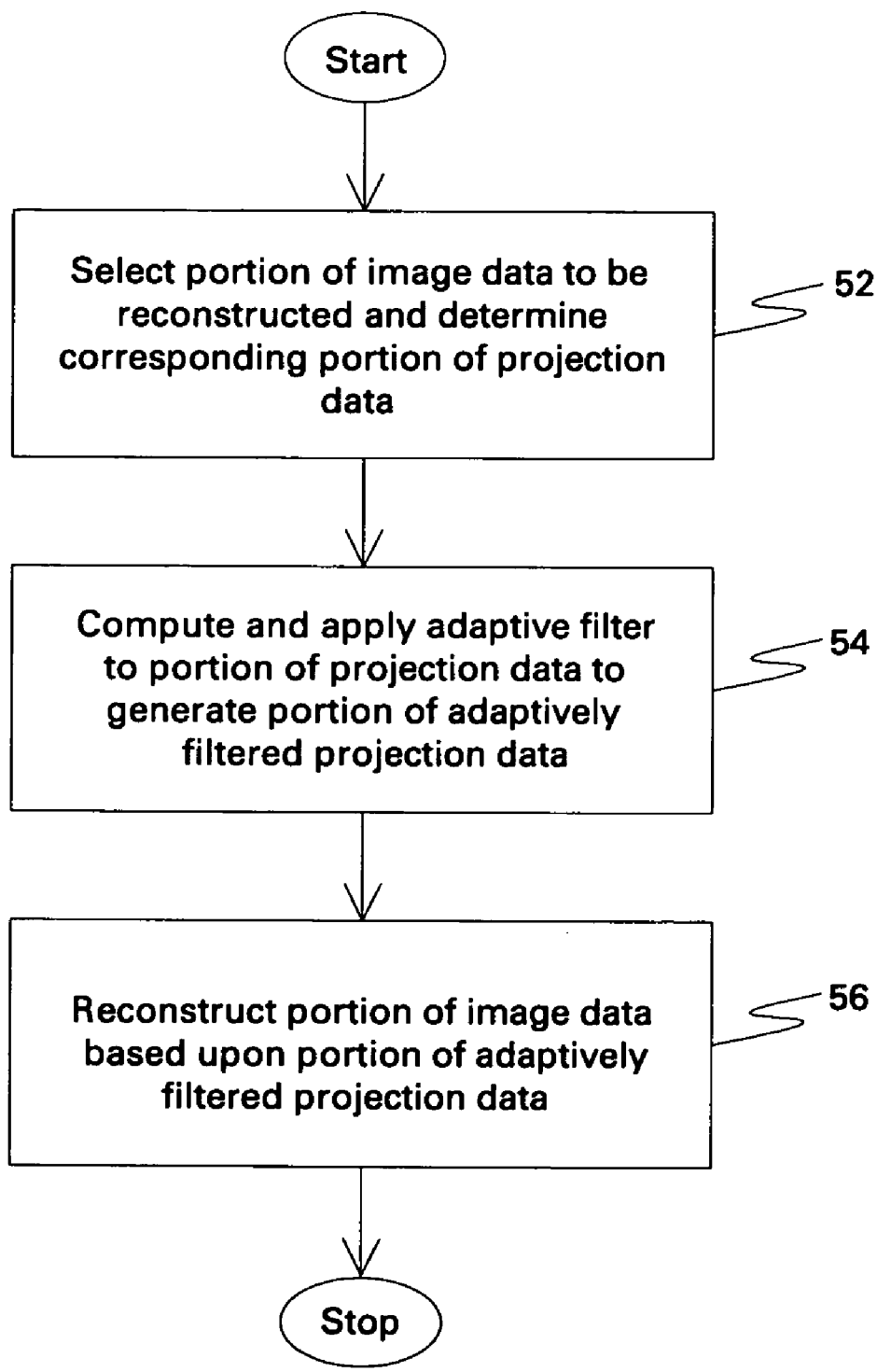
FIG. 4 is a flowchart of exemplary logic including exemplary steps for reconstructing image data acquired by the CT system of FIG. 1 in accordance with embodiments of the present technique.

FIG. 4 is a flowchart 51 of exemplary logic including exemplary steps for reconstructing image data acquired by the CT system 10 of FIG. 1 in accordance with the present technique. In step 52, a portion of image data to be reconstructed is selected and the corresponding portion of projection data is determined. The portion of projection data comprises a set of projection data elements. The projection data are sometimes referred to as a sinogram. The sinogram typically comprises a plurality of sinogram elements. Also, as used herein, the term "portion of projection data" refers to all the projection data elements needed to reconstruct the portion of image data using either backprojection, filtered backprojection, or any other suitable reconstruction techniques mentioned above.

In accordance with a specific embodiment of the present technique, a portion of image data corresponds to a pixel in the image data. That is, for each image pixel in the portion of image data, the present technique determines the set of projection data elements that contribute to the pixel via backprojection, filtered backprojection, or other suitable techniques. In an alternate embodiment, the portion of image data may also correspond to a group of pixels in the image data. In the present technique, a trade-off may be made by considering an image region (comprising a group of pixels) as opposed to each individual pixel, to increase efficiency and reduce computation time.

In step 54, an adaptive filter is computed and applied to the portion of projection data to generate a portion of adaptively-filtered projection data. In accordance with the present technique, the adaptive filter is computed based upon desired quality properties of the portion of image data as will be described in greater detail below. The adaptive filter generally comprises a spatially variant filter to perform filtering in a radial dimension, an azimuthal dimension, a longitudinal dimension or a time dimension. Alternatively, the adaptive filter may also comprise a smoothing kernel with spatially varying properties such as the effective smoothing width of the adaptive filter.

Figure 5:
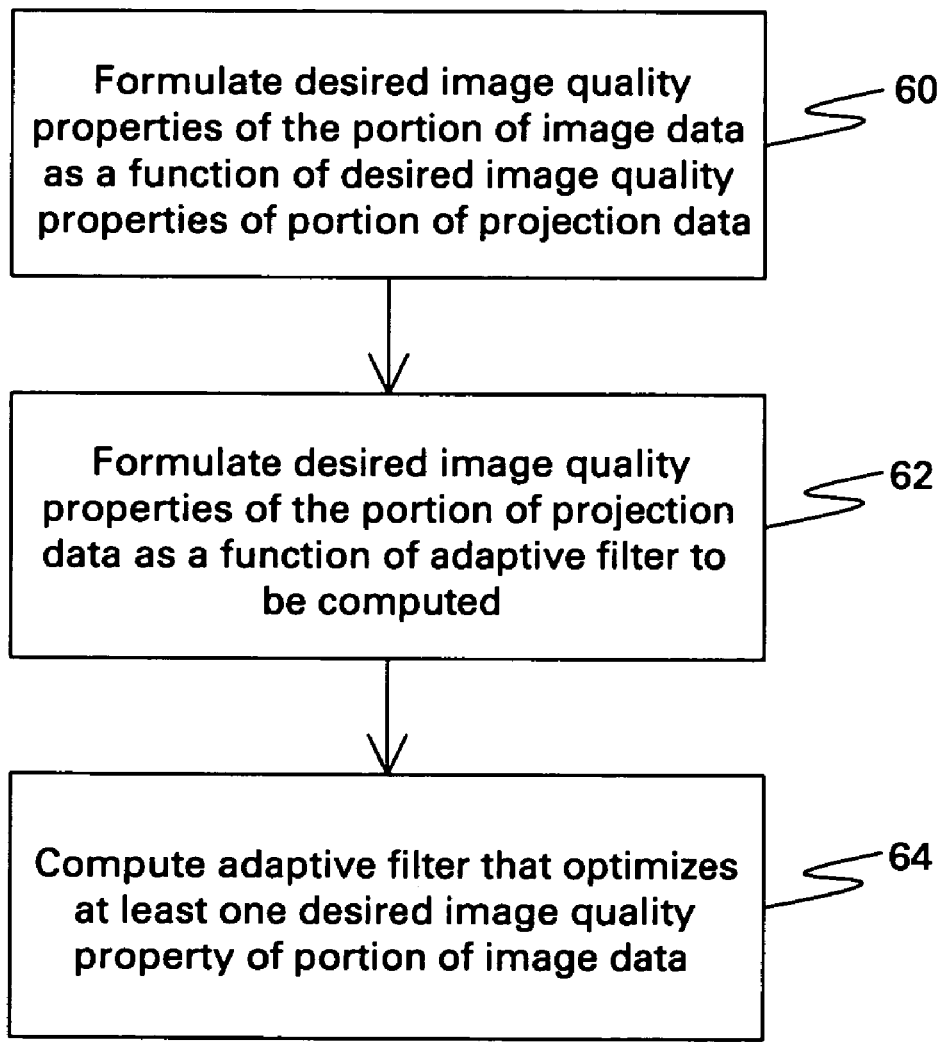
FIG. 5 is a flowchart describing in greater detail certain exemplary manners for implementing the process of FIG. 4.

The adaptive filter is computed based upon attenuation values in the portion of projection data. In particular, the adaptive filter is computed based upon one or more desired statistical measures associated with the attenuation values of the portion of projection data. In accordance with the present technique, the statistical measures comprise mean and variance measures. Alternatively, the adaptive filter may also be computed based upon properties of the imaging geometry associated with the computed tomography system 10. Image geometry properties may include, for example, detector point spread function, azimuthal blur, detector aperture and focal spot size. FIG. 5 describes in greater detail, additional steps that may be included for computing the adaptive filter summarized in step 54.

Referring again to step 54, the adaptive filter may be applied subsequent to one or more pre-processing steps applied to the portion of projection data. Pre-processing may comprise corrections, calibrations, iterative corrections, filtering steps, ramp filtering or interpolation steps applied to the projection data. In an alternate embodiment, the adaptive filter may also be applied to the portion of projection data as part of the reconstruction process described in step 56 below.

In step 56, the portion of image data is reconstructed based upon the portion of adaptively-filtered projection data. In accordance with the present technique, reconstructing the portion of image data based upon the portion of adaptively-filtered projection data may be performed using various reconstruction techniques as described in FIG. 1, such as, for example, filtered backprojection reconstruction, Radon-based inversion reconstruction, Fourier-based reconstruction, any type of direct reconstruction, maximum likelihood reconstruction, maximum posteriori reconstruction, Bayesian reconstruction, least-squares reconstruction, algebraic reconstruction or any type of iterative reconstruction technique. The adaptive filter may also be applied to the portion of projection data as part of the reconstruction step 56, by using a backprojection with an adaptive interpolation width. In accordance with the present technique, the backprojection is performed using a Distance-Driven backprojection wherein the effective image pixel size (as determined by the pixel boundaries) is larger or smaller than the actual pixel spacing. The above steps, 54, 56 and 58 of selecting, computing and reconstructing described above is accordingly repeated for every pixel comprising the portion of image data.

FIG. 5 is a flowchart 58 summarizing in greater detail exemplary processes that may be included for computing the adaptive filter summarized in step 54 of FIG. 4. In step 60, desired quality properties of the portion of image data as a function of desired quality properties of the portion of projection data are formulated. In accordance with one expression of the present technique, the quality properties comprise noise and spatial resolution. As will be appreciated by those skilled in the art, noise refers to errors in image pixel values caused by statistical fluctuations in the projection data. The fluctuations may generally be caused by quantum fluctuations, thermal or electronic noise or quantization noise (generally caused by the finite dynamic range of the data acquisition system). The spatial resolution is generally a function of the imaging geometry associated with the imaging system and depends on a plurality of parameters, such as, for example, focal spot dimensions, detector cell dimensions, detector cross talk, rotational blur, sampling pattern used for acquiring the projection data, reconstruction kernel, table feed, interpolation methods and position in the scan field.

Referring again to step 60 of FIG. 5, in accordance with the present technique, the noise and spatial resolution in the portion of image data are formulated as a function of the noise and spatial resolution in the portion of projection data. More specifically, the noise and the spatial resolution in the portion of image data are related to the noise and the spatial resolution in all contributing sinogram elements i in the portion of projection data by functions $f_1$ and $g_1$ defined as follows:

$$v = f_1(\{v_i\}) \quad (1)$$

$$w = g_1(\{w_i\}) \quad (2)$$

wherein, $v_i$ corresponds to a variance measure associated with each sinogram element in the portion of projection data, $w_i$ corresponds to a measure of spatial extent associated with each sinogram element in the portion of projection data, v corresponds to a variance measure associated with the portion of image data, w corresponds to a measure of spatial extent associated with the portion of image data and i is an index that corresponds to a projection data element that contributes to a pixel in the portion of image data. As used herein, the term "spatial extent" represents a measure for spatial resolution, such as for example, the full-width-at-half-maximum (FWHM) of the point-spread-function (PSF).

Referring to step 54 of flowchart 51 in FIG. 4, the computation of the adaptive filter may also be performed using one or more statistical measures associated with the projection data. Referring to the equations above, the sets $\{v_i\}$ and $\{w_i\}$ may be approximated by the sets, $E\{v_i\}$, $E\{w_i\}$, $S\{v_i\}$, and $S\{w_i\}$, wherein the sets $E\{v_i\}$, $E\{w_i\}$, $S\{v_i\}$, and $S\{w_i\}$ correspond to the mean and the standard deviation of the sets $\{v_i\}$ and $\{w_i\}$ respectively. As is apparent to those skilled in the art, the above approximations significantly reduce the time to compute the adaptive filter.

In accordance with a specific embodiment of the present technique, the relationships in equations (1) and (2) are modeled for example by the following equations:

$$v = \sum_{i=1}^{M} v_i \quad (3)$$

$$w = \sum_{i=1}^{M} w_i \quad (4)$$

wherein M is the total number of elements of the projection data that contribute to a pixel in the portion of image data In step 62, the desired quality properties of the portion of projection data are formulated as a function of the adaptive filter to be computed. In accordance with the present technique, the noise and spatial resolution in the portion of projection data are computed as a function of the adaptive filter to be computed. As described above, in one embodiment of the present technique, the adaptive filter is a smoothing kernel. For implementation purposes, a smoothing kernel with width $\sigma_i$ is applied to each sinogram element i associated with the portion of projection data. As will be appreciated by those skilled in the art, as a result of the application of the smoothing kernel to each sinogram element i associated with the portion of projection data, the variance measure decreases and the spatial extent increases. Consequently, as a result of step 62, equations (1) and (2) may be represented as follows:

$$w'_i = f_2(w_i, \sigma_i) \quad (5)$$

$$v'_i = g_2(v_i, \sigma_i) \quad (6)$$

or for example:

$$w'_i = \sqrt{w_i^2 + \sigma_i^2} \quad (7)$$

$$v'_i = v_i \cdot \frac{w_i}{w'_i} \quad (8)$$

Similarly, in the presence of an adaptive filter $\sigma_i$, equations (1) and (2) may be formulated as follows:

$$v' = f_1(\{v'_i\}) \quad (9)$$

$$w' = g_1(\{w'_i\}) \quad (10)$$

or for example:

$$v' = \sum_{i=1}^{M} v'_i \quad (11)$$

$$w' = \sum_{i=1}^{M} w'_i \quad (12)$$

wherein, $v'_i$, $w'_i$, $v'$, and $w'$ are the resulting equivalents of $v_i$, $w_i$, v, and w respectively, after the application of the adaptive filter.

In step 64, the adaptive filter $\sigma_i$ that optimizes at least one desired quality property of the portion of image data is computed based on one or more constraints. That is, for each pixel in the portion of image data, an adaptive filter $\sigma_i$ is chosen that minimizes both v' and w', or that minimizes v' under certain constraints on w' or vice versa. Such a constraint may comprise, for example, using a pre-defined upper limit on w', wherein w' may not be higher than the upper limit. Such a constraint may also comprise, for example, using a pre-defined upper limit on w' relative to w, wherein w' may not exceed w by more than a pre-defined percentage.

The optimization step 64 may be represented as a constrained optimization problem. As will be appreciated by those skilled in the art, a constrained optimization problem may be solved by any of the well-known optimization algorithms known in the art, such as for example, Lagrange multipliers. As a result of the optimization step 64, an adaptive filter is obtained for each image pixel (or alternatively, for a group of image pixels) so that the image quality in the image pixel or group of pixels is optimized after reconstruction.

The embodiments illustrated and described above provide a technique for reconstructing image data acquired from an imaging system. The embodiments described above have several advantages compared to existing reconstructing techniques including lower image noise, higher spatial resolution, lower X-ray dose and reduced reconstruction time. In addition, the trade-off between noise and spatial resolution is localized to each pixel (or group of pixels) being reconstructed and not global or fixed for the entire image. Furthermore, the amount of smoothing applied to the portion of projection data is performed analytically rather than empirically. As will be appreciated by those skilled in the art, empirical computations are typically based on data observations and are somewhat approximate. An empirical computation of the adaptive filter, for example, may comprise, assigning a value of zero to the adaptive filter $\sigma_i$, to a large percentage (say 97%) of the projection data (that is, to the projection data with the lowest noise level) and assigning a constant value to the adaptive filter for the remaining percentage (say 3%) of the projection data.

In addition, the adaptive filter may not necessarily be characterized by one value of $\sigma_i$ for each contributing sinogram element i as described above, and may be alternatively characterized using more complex adaptive filters, such as for example, in cases wherein the strength of the adaptive filter is adapted independently in multiple dimensions.

The above technique may be executed on typical patient geometries such as the abdomen, brain and thorax. In addition, the computation of the adaptive filter as described above may be simplified by the creation of look up tables based on typical patient anatomies or anatomical maps or dictionaries. That is, the amount of smoothing applied to the projection data may be parameterized based on typical patient anatomies and/or geometries, patient size and scan protocol, wherein the parameterized smoothing comprises using pre-computed information about patient anatomy and estimates of patient geometry. This pre-computed information may then be applied to new patient data resulting in reduced reconstruction times.

Further, the above technique may be employed in imaging modalities other than CT such as for example, Positron Emission Tomography (PET) systems, Single Photon Emission Computed Tomography (SPECT) systems, projection mode Magnetic Resonance (MR) systems and optical tomography systems. The techniques equally apply to various generations of such systems, for example, third, fourth or higher-generation of CT systems. Further the above technique may be used in non-medical CT applications such as, for example, with industrial systems that may inspect inanimate parts for dimensionality, uniformity of material, and for deformities and/or existence of cracks or fissures. As another example, these techniques are well suited for explosive detection systems that screen commercial luggage for possible threat objects, where a trade-off between image noise and resolution can be leveraged.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method for reconstructing image data acquired by a computed tomography system comprising:
   selecting a portion of image data to be reconstructed and determining a corresponding portion of projection data;
   computing and applying an adaptive filter to the portion of projection data to generate a portion of adaptively-filtered projection data, wherein the adaptive filter is computed based upon desired quality properties of the portion of image data, and wherein computing the adaptive filter further comprises: formulating the desired quality properties of the portion of image data as a function of properties of the portion of projection data, resulting in desired quality properties of the portion of projection data; formulating the desired quality properties of the portion of projection data as a function of the adaptive filter to be computed; and computing the adaptive filter that optimizes at least one desired quality property of the portion of image data; and
   reconstructing the portion of image data based upon the portion of adaptively-filtered projection data.

2. The method of claim 1, wherein the portion of image data corresponds to a pixel in the image data, and wherein the step of selecting, computing and reconstructing is repeated for every pixel comprising the portion of image data.

3. The method of claim 1, wherein the portion of image data corresponds to a group of pixels in the image data and wherein the step of selecting, computing and reconstructing is repeated for every group of pixels comprising the portion of image data.

4. The method of claim 1, wherein the portion of projection data comprises projection data needed to reconstruct the portion of the image data using at least one of backprojection and filtered backprojection.

5. The method of claim 1, wherein the adaptive filter is a spatially variant filter.

6. The method of claim 5, wherein the adaptive filter performs filtering in at least one of a radial dimension, an azimuthal dimension, a longitudinal dimension and a time dimension.

7. The method of claim 1, wherein the adaptive filter is a smoothing kernel with spatially varying properties.

8. The method of claim 1, wherein the adaptive filter is computed based upon attenuation values in the portion of projection data.

9. The method of claim 8, wherein the adaptive filter is computed based upon at least one statistical measure associated with the attenuation values in the portion of projection data.

10. The method of claim 1, wherein the adaptive filter is computed based upon properties of the imaging geometry associated with the computed tomography system.

11. The method of claim 1, wherein the desired quality properties comprise noise and spatial resolution.

12. The method of claim 1, wherein computing the adaptive filter further comprises:
    formulating noise in the portion of image data as a function of noise in the portion of projection data;
    formulating the noise in the portion of projection data as a function of the adaptive filter to be computed; and
    computing the adaptive filter that minimizes the noise in the portion of image data.

13. The method of claim 1, wherein computing the adaptive filter further comprises:
formulating spatial resolution in the portion of image data as a function of spatial resolution in the portion of projection data;
formulating the spatial resolution in the portion of projection data as a function of the adaptive filter to be computed; and
computing the adaptive filter that satisfies one or more constraints on the spatial resolution associated with the portion of image data.

14. The method of claim 1, comprising applying the adaptive filter subsequent to a pre-processing step applied to the portion of projection data.

15. The method of claim 14, wherein the pre-processing comprises at least one of corrections, calibrations, iterative corrections, filtering steps, ramp filtering and interpolation steps applied to the portion of projection data.

16. The method of claim 1, comprising applying the adaptive filter as part of the reconstruction process by using a backprojection with an adaptive interpolation width.

17. The method of claim 16 further comprising using a distance-driven backprojection wherein the size of each image pixel as determined by the pixel boundaries is larger or smaller than an actual value of pixel spacing.

18. The method of claim 1, wherein reconstructing the portion of image data based upon the portion of projection data comprises using at least one of a filtered backprojection reconstruction, a Radon-based inversion reconstruction, a Fourier-based reconstruction, a direct reconstruction, a maximum likelihood reconstruction, a maximum a posteriori reconstruction, a Bayesian reconstruction, a least-squares reconstruction, an algebraic reconstruction and an iterative reconstruction technique.

19. The method of claim 1, wherein the computation of the adaptive filter is pre-computed based on patient anatomy and estimates of patient geometry to reduce reconstruction time.

20. A computed tomography system for reconstructing image data comprising:
an X-ray source to project a plurality of X-ray beams through an object;
a detector to produce a plurality of electrical signals in response to receive X-ray beams from the source; and
a system controller to process the plurality of electrical signals to generate a plurality of projection data elements, wherein the system controller selects a portion of image data to be reconstructed and determines a corresponding portion of projection data; computes and applies an adaptive filter to the portion of projection data to generate a portion of adaptively-filtered projection data, wherein the adaptive filter is computed based upon desired quality properties of the portion of image data; and wherein the system controller further computes the adaptive filter based on formulating the desired quality properties of the portion of image data as a function of properties of the portion of projection data, resulting in desired quality properties of the portion of projection data; formulating the desired quality properties of the portion of projection data as a function of the adaptive filter to be computed; and computing the adaptive filter that optimizes at least one desired quality property of the portion of image data and reconstructs the portion of image data based upon the portion of adaptively-filtered projection data.

21. The computed tomography system of claim 20, wherein the portion of image data corresponds to a pixel in the image data, and wherein the system controller repeats the step of selection, computation and reconstruction for every pixel comprising the portion of image data.

22. The computed tomography system of claim 20, wherein the portion of image data corresponds to a group of pixels in the image data, and wherein the system controller repeats the step of selection, computation and reconstruction for every group of pixels comprising the portion of image data.

23. The computed tomography system of claim 20, wherein the system controller computes the adaptive filter based upon at least one statistical measure associated with attenuation values in the portion of projection data.

24. The computed tomography system of claim 20, wherein the system controller further computes the adaptive filter based on:
formulating noise in the portion of image data as a function of noise in the portion of projection data;
formulating the noise in the portion of projection data as a function of the adaptive filter to be computed; and
computing the adaptive filter that minimizes the noise in the portion of image data.

25. The computed tomography system of claim 20 wherein the system controller further computes the adaptive filter based on:
formulating spatial resolution in the portion of image data as a function of spatial resolution in the portion of projection data;
formulating the spatial resolution in the portion of projection data as a function of the adaptive filter to be computed; and
computing the adaptive filter that satisfies one or more constraints on the spatial resolution associated with the portion of image data.

26. The computed tomography system of claim 20, wherein the system controller pre-processes the portion of projection data prior to applying the adaptive filter to the portion of projection data.

27. The computed tomography system of claim 26, wherein the pre-processing comprises at least one of corrections, calibrations, iterative corrections, filtering steps, ramp filtering and interpolation steps applied to the portion of projection data.

28. The computed tomography system of claim 20, wherein the system controller applies the adaptive filter as part of the reconstruction process by using a backprojection with an adaptive interpolation width.

29. The computed tomography system of claim 28, wherein the system controller uses at least one of a filtered backprojection reconstruction, a Radon based inversion reconstruction, a Fourier based reconstruction, a direct reconstruction, a maximum likelihood reconstruction, a maximum a posteriori reconstruction, a Bayesian reconstruction, a least-squares reconstruction, an algebraic reconstruction and an iterative reconstruction to reconstruct the portion of image data based upon the portion of projection data.

30. The computed tomography system of claim 20, wherein the system controller receives pre-computed information related to patient anatomy and estimates of patient geometry to reduce reconstruction time.

* * * * *